(12) United States Patent
Bemment et al.

(10) Patent No.: US 11,078,838 B2
(45) Date of Patent: Aug. 3, 2021

(54) GAS TURBINE ENGINE COMPRESSOR CONTROL METHOD

(71) Applicant: ROLLS-ROYCE plc, London (GB)

(72) Inventors: Craig W. Bemment, Derby (GB); David P. Scothern, Derby (GB)

(73) Assignee: Rolls-Royce plc

( * ) Notice: Subject to any disclaimer, the term of this patent is extended or adjusted under 35 U.S.C. 154(b) by 297 days.

(21) Appl. No.: 16/396,918

(22) Filed: Apr. 29, 2019

(65) Prior Publication Data

US 2020/0025073 A1 Jan. 23, 2020

(30) Foreign Application Priority Data

May 23, 2018 (GB) .................................. 1808436

(51) Int. Cl.
| | |
|---|---|
| *F02C 6/08* | (2006.01) |
| *B64D 13/06* | (2006.01) |
| *F02C 9/18* | (2006.01) |
| *F02C 7/277* | (2006.01) |
| *F02C 7/32* | (2006.01) |
| *F02C 7/36* | (2006.01) |

(52) U.S. Cl.
CPC ............... *F02C 6/08* (2013.01); *B64D 13/06* (2013.01); *F02C 7/277* (2013.01); *F02C 9/18* (2013.01); *B64D 2013/0696* (2013.01); *F02C 7/32* (2013.01); *F02C 7/36* (2013.01); *F05D 2220/50* (2013.01); *F05D 2270/101* (2013.01)

(58) Field of Classification Search
CPC ...... F02C 6/08; F02C 7/32; F02C 7/36; F02C 7/277; F02C 3/13; F02C 9/18; F02C 9/52; B64D 13/06; B64D 2013/0603; B64D 2013/0618; F05D 2220/50; F05D 2270/101; F05D 2260/606; F05D 2260/85; F02K 3/02; F01D 17/105; F01D 19/00; F04D 27/009; F04D 27/02; F04D 27/0215; F04D 27/0223
See application file for complete search history.

(56) References Cited

U.S. PATENT DOCUMENTS

| | | |
|---|---|---|
| 5,305,156 A | 4/1994 | Takei |
| 7,584,600 B2 | 9/2009 | Klingels |

(Continued)

OTHER PUBLICATIONS

European Search Report completed Oct. 9, 2019 and issued in connection with EP Appln. No. 19171885.7.

(Continued)

*Primary Examiner* — Scott J Walthour
*Assistant Examiner* — David P. Olynick
(74) *Attorney, Agent, or Firm* — Barnes & Thornburg LLP

(57) ABSTRACT

A method of operating a gas turbine engine compressor. The engine comprises a compressor having an environmental control system bleed port having an outlet in fluid communication with an aircraft environmental control system air duct, and an air turbine starter configured to rotate a compressor shaft of the gas turbine engine. The air turbine starter has an inlet in fluid communication with the environmental control system air duct via an air turbine valve. The method comprises determining a surge margin of the compressor, and where the surge margin of the compressor is determined to be below a predetermined minimum surge margin, opening the air turbine valve to supply air to the air turbine.

9 Claims, 4 Drawing Sheets

(56) References Cited

U.S. PATENT DOCUMENTS

| | | | |
|---|---|---|---|
| 2006/0260323 A1 | 11/2006 | Moulebhar | |
| 2009/0288421 A1* | 11/2009 | Zeiner | F02C 3/10 |
| | | | 60/792 |
| 2010/0314877 A1 | 12/2010 | Finney | |
| 2011/0154830 A1 | 6/2011 | Bowman et al. | |
| 2015/0354464 A1* | 12/2015 | Hillel | F04D 27/0261 |
| | | | 415/1 |
| 2016/0369705 A1* | 12/2016 | Mackin | F02C 6/08 |
| 2017/0226934 A1* | 8/2017 | Robic | F02C 7/36 |
| 2018/0340474 A1* | 11/2018 | Baladi | F04D 27/0215 |

OTHER PUBLICATIONS

Great Britain search report dated Nov. 20, 2018, issued in GB Patent Application No. 1808436.8.

\* cited by examiner

GAS TURBINE ENGINE COMPRESSOR CONTROL METHOD

CROSS-REFERENCE TO RELATED APPLICATIONS

This application is based upon and claims the benefit of priority from British Patent Application No. GB 1808436.8, filed on 23 May 2018, the entire contents of which are incorporated by reference.

BACKGROUND

Technical Field

The present disclosure concerns a method of controlling a compressor of a gas turbine engine, a compressor system of a gas turbine engine, and a gas turbine engine including the compressor system.

Description of Related Prior Art

Gas turbine engines include at least a compressor, a combustor and a turbine in flow series. Interconnecting shafts connect the compressors and turbines, such that each turbine drives a respective compressor.

Control of these components is necessary to ensure reliable and safe operation. In particular, the compressor must be controlled to avoid stall or surge. Stalls and surges are local disruption of the airflow within the compressor. Stalls can be prevented through careful management of fuel flow, and also by compressor variable geometry features, such as variable stator vanes and compressor handling bleeds.

Compressor handling bleeds comprise ports in the side of the compressor which enable high pressure air to be exhaust from a compressor stage, upstream of the combustor. The exhausted air is then dumped overboard into the bypass flow, and is not further used. The bleeds can be opened and closed in dependence on a control schedule. When a bleed is opened, pressure downstream of the compressor stage is decreased, thereby reducing the likelihood of a stall.

However, bleeding compressor air from the compressor is relatively inefficient, since the work done to compress the air is wasted. Consequently, any operation of the handling bleeds is undesirable.

Aircraft gas turbine engines typically also comprise environmental control system (ECS) bleeds (also known as "customer bleeds") which supply high pressure air from the compressor for aircraft pneumatic systems and cabin air. These ECS bleeds operate separately to the handling bleeds in accordance with a separate schedule.

SUMMARY

The present disclosure seeks to provide a method of operation and a control system which provides for more efficient operation of compressors having handling bleed valves.

According to a first aspect there is provided a method of operating a gas turbine engine compressor, the engine comprising:
a compressor having an environmental control system bleed port having an outlet in fluid communication with an aircraft environmental control system air duct;
and an air turbine starter configured to rotate a compressor shaft of the gas turbine engine, the air turbine starter having an inlet in fluid communication with the environmental control system air duct via an air turbine valve, wherein the method comprises:
determining a surge margin of the compressor; and
where the surge margin of the compressor is determined to be below a predetermined minimum surge margin, opening the air turbine valve to supply air to the air turbine.

Advantageously, by providing air from the environmental control system bleed port to the air starter in the event where the compressor is close to stall or surge, the bleed air is used to provide additional power to the shaft that powers the compressor. In view of this additional shaft power, the shaft load is alleviated, and the compressor is moved further away from surge. Consequently, a smaller amount of air can be bled for the same increase in stall margin, resulting in increased compressor efficiency. Furthermore, bleed flow through the environmental control system bleed can be assured, even where the environmental control system is not operating (such as in the event of an ECS pack failure, or other shut-down). Consequently, ECS bleed flow can be accounted for in the handling bleed and/or variable stator vane (VSV) schedule, thereby permitting a less conservative schedule, and higher compressor efficiency.

The method may comprise determining whether an environmental control system air conditioning system which communicates with the environmental control system air duct is functioning, and if it is not functioning, and the surge margin of the compressor is determined to be below the predetermined minimum surge margin, opening the air turbine valve to supply air to the air turbine.

The surge margin may be a current measured surge margin or a predicted future surge margin.

The gas turbine engine may comprise a low pressure compressor coupled to a low pressure turbine via a low pressure shaft, and a high pressure compressor coupled to a high pressure turbine via a high pressure shaft. Where the environmental control system bleed port is provided in communication with the low pressure compressor, the air starter may be configured to drive the low pressure shaft. Alternatively, where the environmental control system bleed port is provided in communication with the high pressure compressor, the air starter may be configured to drive the high pressure shaft.

The gas turbine engine may further comprise a handling bleed configured to exhaust air from a compressor stage of the compressor. The method may comprise opening the handling bleed where the mass flow capability of the environmental control system bleed port is determined to be insufficient to maintain the compressor surge margin above the predetermined minimum surge margin.

The air starter may be coupled to the compressor shaft via an accessory gearbox.

According to a second aspect there is provided a gas turbine engine comprising a controller configured to operate in accordance with the method of the first aspect.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

DESCRIPTION OF THE DRAWINGS

An embodiment will now be described by way of example only, with reference to the Figures, in which.

DETAILED DESCRIPTION

Figure 1:
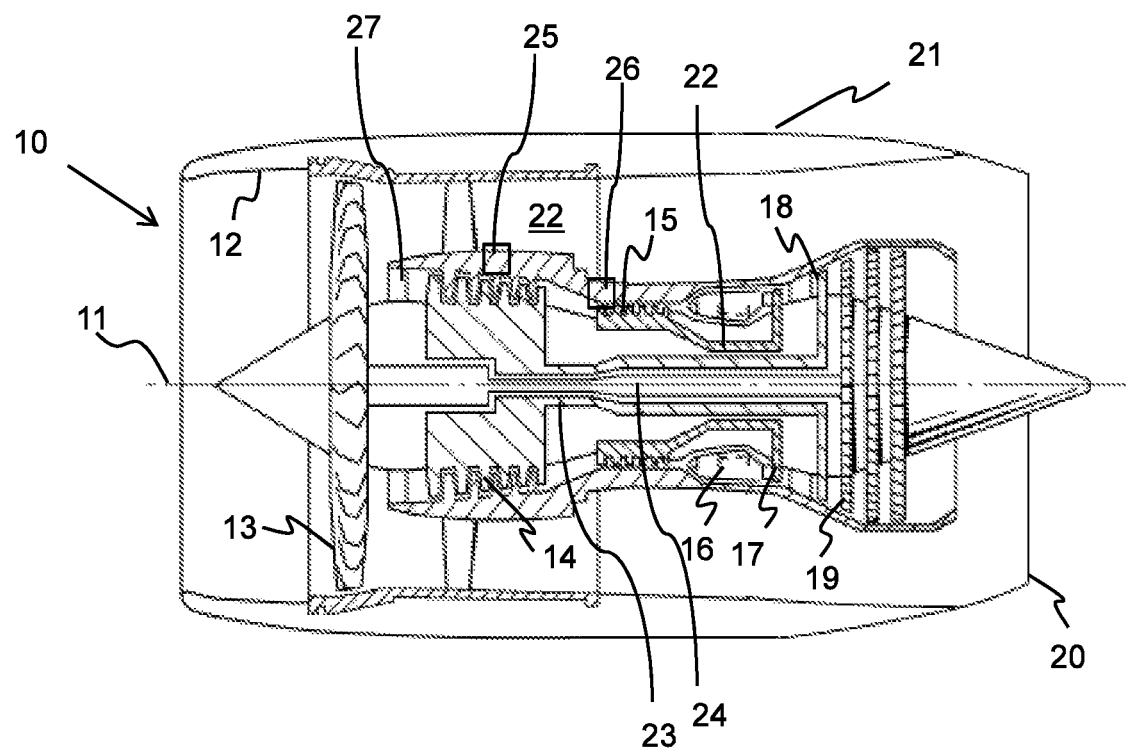
FIG. 1 is a sectional side view of a gas turbine engine.

With reference to FIG. 1, a gas turbine engine is generally indicated at 10, having a principal and rotational axis 11. The engine 10 comprises, in axial flow series, an air intake 12, a propulsive fan 13, an intermediate-pressure compressor 14, a high pressure compressor 15, combustion equipment 16, a high-pressure turbine 17, an intermediate-pressure turbine 18, a low-pressure turbine 19 and an exhaust nozzle 20. A nacelle 21 generally surrounds the engine 10 and defines the intake 12.

The gas turbine engine 10 works in the conventional manner so that air entering the intake 12 is accelerated by the fan 13 to produce two air flows: a first air flow into the compressor 14 and a second air flow which passes through a bypass duct 21 to provide propulsive thrust. The intermediate-pressure compressor 14 compresses the air flow directed into it before delivering that air to high-pressure compressor 15 for further compression, before delivering that air to the combustion equipment 16.

In the combustion equipment 16 the air flow is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high 17, intermediate 18 and low 19 pressure turbines drive respectively the high pressure compressor 15, the intermediate pressure compressor 14 and the fan 13, each by suitable interconnecting shaft 22, 23, 24.

Other gas turbine engines to which the present disclosure may be applied may have alternative configurations. By way of example such engines may have an alternative number of interconnecting shafts (e.g. three) and/or an alternative number of compressors and/or turbines. Further the engine may comprise a gearbox provided in the drive train from a turbine to a compressor and/or fan.

Each of the high and the intermediate pressure compressors 14, 15 are of a variable geometry type, having handling bleeds 25, 26. The intermediate pressure compressor 14 also includes variable guide vanes 27.

Figure 2:
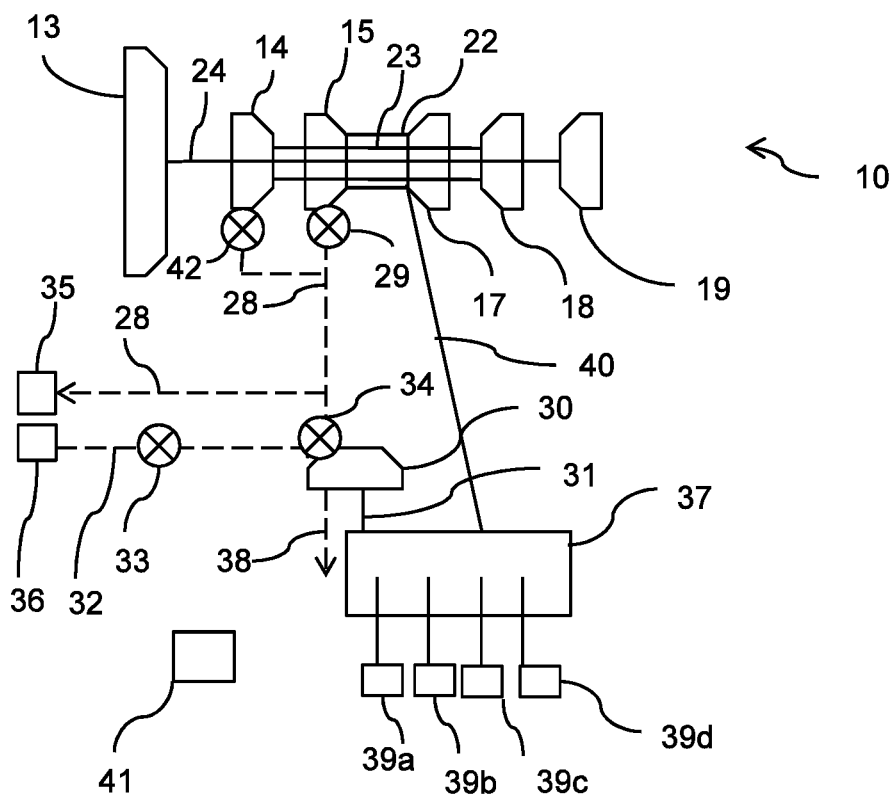
FIG. 2 is a schematic drawing illustrating a compressor management system for the gas turbine engine of FIG. 1.

The engine 10 also forms part of an aircraft environmental control system (ECS), shown schematically in FIG. 2. The environmental control system comprises an ECS duct 28, which is in fluid communication with an air cycle machine air conditioning unit 35, and is configured to provide pressurised, cooled air to the aircraft cabin. The duct 28 is supplied with air from a compressor of the gas turbine engine 10. In this case, air to the ECS duct 28 can be supplied from at least the high pressure compressor 15 via a high pressure ECS bleed port comprising a valve 29. It will be understood that, in some cases, additional ECS bleed valves may be provided. For example, in the described embodiment, an optional intermediate pressure ECS bleed valve 42 is provided in fluid communication with the intermediate pressure compressor 14 and the ECS duct 28, via a manifold. The valves 29, 42 can be operated to supply air to the ECS duct 28 from either or both of the high pressure and intermediate pressure compressors 14, 15.

The ECS further includes an air starter turbine 30. The air starter turbine 30 is of a conventional axial or radial turbine type, and is configured to receive high pressure input air from a high pressure air source, and provide torque to an output shaft 31. Air from the starter 30 is exhausted overboard through an outlet 38, typically back into the exhaust duct.

The air starter turbine is configured to receive high pressure air from one of two inputs. A first input is provided from an auxiliary power unit pneumatic line 32. The air through the pneumatic line is provided from an auxiliary power unit (APU) 36 compressor, or from one of the other engines 10 of the aircraft. The APU 36 is normally a separate gas turbine engine, which is used to provide pneumatic, hydraulic and electrical power where the main gas turbine engine 10 is inoperative. Airflow through the APU pneumatic line 32 is controlled by a first inlet valve 33, which is provided upstream of the air starter turbine 30. Where the first inlet valve 33 is in an on position, air from the APU 36 can be provided from the APU to turn the starter 30, and when in an off position, air is prevented from flowing between the APU and the starter 30.

A second input to the air starter turbine 30 is provided from the ACS duct 28. Consequently, air is provided to the air starter turbine from either the auxiliary power unit pneumatic line 32, or the ECS duct 28

The starter 30 is in turn mechanically coupled to an auxiliary gearbox 37 via the starter output shaft 31. The auxiliary gearbox 37 provides motive power to engine accessories 39a-d. Typical accessories include engine fuel and oil pumps, and electrical generators. The gearbox 37 is driven by one of two input mechanical power sources, depending on engine operation. A first power input source comprises the starter output shaft 31, which may be coupled via a clutch (not shown). A second power input source comprises an engine accessory offtake shaft 40. The offtake shaft 40 is mechanically coupled to the high pressure engine shaft 22. Consequently, the starter turbine 28 is pneumatically coupled to the high pressure compressor 15, and mechanically coupled to the high pressure shaft 22. Since the high pressure shaft is mechanically coupled to the high pressure compressor 15, it will be understood that operation of the air starter turbine 30 will affect both high pressure compressor 15 pressure, and high pressure compressor 15 speed (via the high pressure shaft 22). In other words, the air starter 30 is mechanically coupled to a main engine shaft, and is pneumatically coupled to a compressor which is mechanically coupled to the same main engine shaft.

In another example, the air starter could be (alternatively or in addition) both pneumatically and mechanically coupled to the intermediate pressure shaft. In either case, it is the same shaft which provides both high pressure air to the air starter, and which is mechanically driven by the air starter.

Air flow through the starter 30 is controlled via an air starter valve 34, which is controllable to provide air through the air starter from either or both of the duct 28 or 32. The valve 34 is controllable between an on position, in which air flows to the air starter 34, and an off position in which air does not flow. The valve 34 may be positionable to intermediate positions, in which more or less air may flow.

A controller 41 is provided, which is configured to control the valves 29, 33, 34 in accordance with one of several operating modes, to ensure efficient operation of the engine 10 in use.

Figure 3:
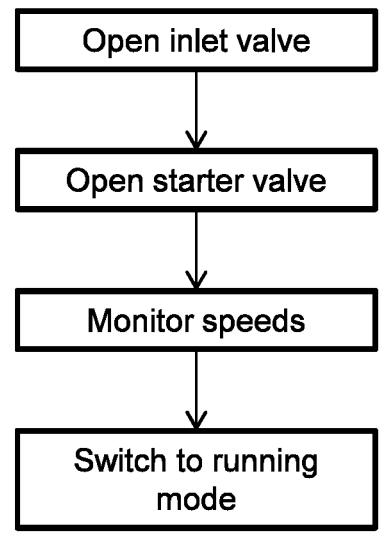
FIG. 3 is a flow diagram illustrating a first operating mode for the compressor management system of FIG. 2.

FIG. 3 shows a method flow chart illustrating how the system operates in a starting mode. In the starting mode, the first inlet valve 33 is commanded to open to provide air from the APU 36 to the air turbine starter 30. The starter turbine valve 34 is also commanded to open to allow air to flow to the starter 30. Consequently, the starter turbine 30 rotates, which in turn rotates the accessory gearbox 37 via the output shaft 31. This in turn causes the offtake shaft 40 to rotate, which rotates the high pressure shaft 22 and high pressure compressor 15 to provide compressed air to start the engine 10. Engine speeds are monitored, and once the speeds attain a required rate, the controller switches the system to running mode.

Figure 4:
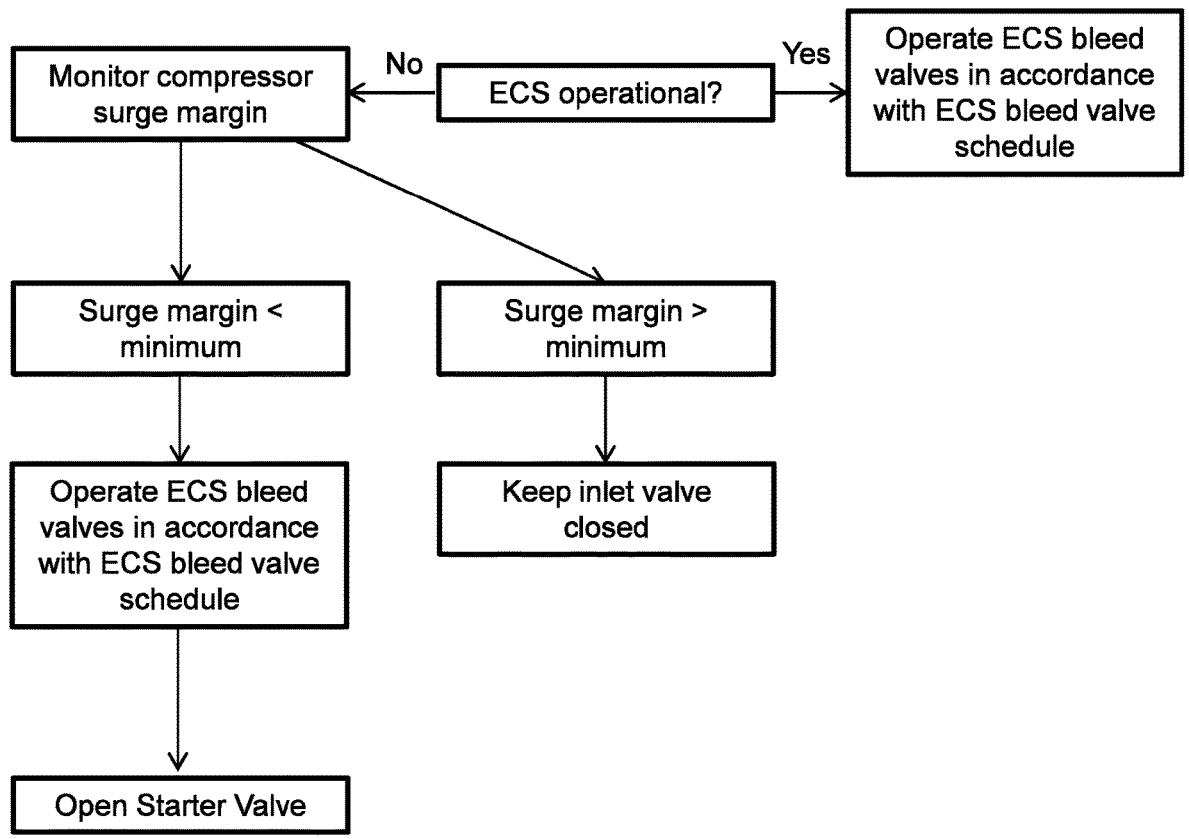
FIG. 4 is a flow diagram illustrating a second operating mode for the compressor management system of FIG. 2.

FIG. 4 shows a method flow chart illustrating how the system operates in a running mode, once the engine 10 is started. Ordinarily, to the running mode, the first inlet valve 33 is closed to prevent air from escaping the APU 26. At least one of the ECS valves 29, 42 is normally open and the air starter valve 34 is closed, such that bleed air from the high pressure compressor 15 is provided to the ECS air conditioning unit 35. The air turbine starter 30 is typically declutched from the accessory gearbox 37, and the gearbox 37 is powered by the offtake shaft 40 by mechanical power provided from the high pressure main engine shaft 22. The ECS valve 29 may be closed in some instances in dependence on an ECS bleed air schedule, where airflow is not required. Alternatively, the ECS bleed flow may be provided from the intermediate pressure port.

When in the running mode, the system determines whether the environmental control system is operational. This determination may be on the basis of a setting controllable by the pilot, such as a switch, or may include sensors to detect ECS failure. Where the ECS is operational, the bleed valves 29, 42 are operated in accordance with an ECS bleed valve schedule. In general, the bleed valve schedule will operate the lowest pressure valve capable of providing the necessary cabin airflow requirements. For example, at low compressor pressure, the valve 42 will be opened and the valve 29 closed, while at higher compressor pressures, the valve 29 will be open and the valve 42 closed.

In general, the aircraft comprises at least two engines, with each engine being associated with a respective air conditioning unit 35. However, in many cases, the air conditioning unit 35 for an engine 10 may be turned off. In such circumstances, flow will be prevented from passing through the air conditioning unit by a valve (not shown) or other means. There are several possible reasons for this. Firstly, adequate airflow, pressure and temperature may be provided by a single air conditioning unit, and so the pilot or control system may elect to turn off one of the units to conserve fuel. Alternatively, one of the air conditioning units may malfunction, which would again necessitate a shutdown. Since the engine will generally continue running in this condition, the engine must be able to maintain adequate surge margin irrespective of whether the air conditioning unit supplied by that engine is functioning or not. Consequently, when designing an engine (and setting a predetermined handling bleed and VSV schedule), a designer cannot take into account the additional bleed flow (and so increased surge margin) that is provided by the air conditioning unit. Consequently, a more conservative compressor schedule must be employed, resulting in low compressor ratios, and therefore increased fuel burn.

The present disclose seeks to overcome this limitation. By providing an alternative route for the airflow (via the starter turbine) in the event of air conditioning unit shutdown, airflow through the ECS bleed valves 14, 15 in normal operation can be accounted for in the handling schedule, and so a smaller compressor margin can be accepted, resulting in increased efficiency. Furthermore, since the airflow passes through the air turbine starter, and back to the compressor shaft, this additional bleed flow is not wasted.

Consequently, where the system determines that the environmental control system is not operational, the system utilises sensors to determine a high pressure compressor 15 surge margin. Various methods may be employed for determining the compressor surge margin. In one example, the shaft speed may be measured, and a surge margin calculated from this measurement.

Alternatively or additionally, other measurements may be taken, such as compressor pressure ratio.

If the high pressure compressor 15 surge margin is determined to be within normal operational limits (i.e. exceeds a predetermined minimum), the ECS bleed valves 29, 42 are closed.

On the other hand, where the high pressure compressor 15 surge margin is determined to be below the predetermined minimum, the ECS bleed valves 29, 42 are again operated in accordance with the ECS bleed valve schedule. However, because air cannot flow into the air conditioning unit 35, another flow path must be provided.

Consequently, the air starter valve 34 is opened, and the clutch to the air starter 30 is also closed, such that the air starter is now powered by air from one of the ECS bleed valves 29, 42 and is mechanically coupled to the high pressure shaft 22. Consequently, the air starter 30 is caused to rotate, which alleviates some of the torque on the spool. In view of the increased speed of the high pressure compressor 15 relative to where the air starter is not operated, the high pressure compressor 15 is moved further from surge, still increasing the surge margin.

Consequently, in view of the energy recovery from the bleed air and resultant reduction in mechanical power offtake, a smaller amount of air can be bled from the compressor 15 for a given increase in surge margin. Consequently, increased efficiency is provided during transient operation. Further advantages of the invention are also realised. Since low surge margin is frequently encountered at low engine speeds, the handling bleeds are frequently in operation during approach to an airport. Handling bleeds produce very high noise levels, and so contribute to a significant proportion of aircraft noise on approach. By reducing bleed flow during transient operation, and routing the bleed flow through a turbine prior to exhaust, both the mass flow and velocity of the bleed flow is reduced, thereby reducing noise significantly. Significant weight savings may also be achieved, since the handling bleed valve 26 could be reduced in size, or deleted entirely.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A method of operating a gas turbine engine, the gas turbine engine comprising:
   a compressor having an environmental control system bleed port having an outlet in fluid communication with an aircraft environmental control system air duct;
   a first valve disposed between the environmental control system bleed port and the aircraft environmental control system air duct;
   an air turbine starter configured to rotate a compressor shaft of the gas turbine engine, the air turbine starter having an inlet in fluid communication, via an air turbine valve, with the environmental control system air duct and a pneumatic line of an auxiliary power unit; and a second valve disposed between the auxiliary power unit and the air turbine valve, wherein the method comprises:

supplying air to an environmental control system air conditioning system from the environmental control system bleed port via the first valve and the aircraft environmental control system air duct;

determining a surge margin of the compressor;

opening the air turbine valve to supply air to the air turbine starter in response to the surge margin being below a predetermined minimum surge margin so that the air turbine starter drives the compressor shaft, wherein a controller is coupled to the first valve, the second valve and the air turbine valve, and is configured: 1) in a starting mode, to open the second valve and the air turbine valve to supply air to the air turbine starter from the pneumatic line and 2) in a running mode, to close the second valve to prevent air from being supplied from the auxiliary power unit to the air turbine starter, receive an indication that the environmental control system air conditioning system is not functioning, compare the surge margin of the compressor to the predetermined minimum surge margin and, in response to receiving the indication that the environmental control system air conditioning system is not functioning and further if the surge margin is below the predetermined minimum surge margin, the controller is configured to open the first valve to supply air to the air turbine starter from the compressor via the environmental control system air duct so that the air turbine starter drives the compressor shaft.

2. The method according to claim 1, wherein the surge margin is one of a current measured surge margin and a predicted future surge margin.

3. The method according to claim 1, wherein the gas turbine engine comprises a low pressure compressor coupled to a low pressure turbine via a low pressure shaft, and a high pressure compressor coupled to a high pressure turbine via a high pressure shaft.

4. The method according to claim 3, wherein the environmental control system bleed port is provided in communication with the low pressure compressor, and the air turbine starter is configured to drive the low pressure shaft.

5. The method according to claim 3, wherein the environmental control system bleed port is provided in communication with the high pressure compressor, and the air turbine starter is configured to drive the high pressure shaft.

6. The method according to claim 5, further comprising the step of opening a handling bleed in response to a mass flow capability of the environmental control system bleed port being determined to be insufficient to maintain the compressor surge margin above the predetermined minimum surge margin.

7. The method according to claim 1, wherein the gas turbine engine further comprises a handling bleed configured to exhaust air from a compressor stage of the compressor.

8. The method according to claim 1, wherein the air turbine starter is coupled to the compressor shaft via an accessory gearbox.

9. A surge margin control system in a gas turbine engine, the surge margin control system comprising:

a compressor having an environmental control system bleed port having an outlet in fluid communication with an aircraft environmental control system air duct;

the environmental control system duct configured to provide pressurized air to an aircraft, the environmental control system duct having an inlet fluidly connected to the compressor of the gas turbine engine via an environmental control system inlet valve, the environmental control system inlet valve disposed between the environmental control system bleed port and the aircraft environmental control system air duct, so that pressurized air from the compressor can be supplied into the environmental control system duct;

an environmental control system air conditioning system that receives air from the environmental control system bleed port via the environmental control system inlet valve and the aircraft environmental control system air duct;

an air turbine starter configured to rotate a compressor shaft of the gas turbine engine, the air turbine starter including an inlet fluidly connected with the environmental control system duct and a pneumatic line of an auxiliary power unit via an air turbine valve with an auxiliary power unit inlet valve further disposed between the auxiliary power unit and the air turbine valve, and a controller coupled to the environmental control system inlet valve, the air turbine valve, and the auxiliary power unit inlet valve, the controller configured to determine the surge margin of the compressor and open the air turbine valve in response to the surge margin being below a predetermined minimum surge margin so that the air turbine starter drives the compressor shaft, wherein the controller is further configured to: 1) in a starting mode, to open the auxiliary power unit inlet valve and the air turbine valve to supply air to the air turbine starter from the pneumatic line and 2) in a running mode, to close the auxiliary power unit inlet valve to prevent air from being supplied from the auxiliary power unit to the air turbine starter, receive an indication that an environmental control system air conditioning system associated with the aircraft is not functioning, compare the surge margin of the compressor to the predetermined minimum surge margin and, in response to receiving the indication that the environmental control system air conditioning system is not functioning and further if the surge margin is below the predetermined minimum surge margin, the controller is configured to open the environmental control system inlet valve to supply air to the air turbine starter from the compressor via the environmental control system air duct so that the air turbine starter drives the compressor shaft.

* * * * *